(12) United States Patent
Huda et al.

(10) Patent No.: US 8,673,146 B2
(45) Date of Patent: *Mar. 18, 2014

(54) PUSH FILTER WITH FLOATING KEY LOCK

(71) Applicants: Stephen P. Huda, Shelton, CT (US); Michael J. Sherman, Woodbury, MN (US); Steven J. Haehn, Oakdale, MN (US)

(72) Inventors: Stephen P. Huda, Shelton, CT (US); Michael J. Sherman, Woodbury, MN (US); Steven J. Haehn, Oakdale, MN (US)

(73) Assignee: KX Technologies LLC, West Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,726

(22) Filed: Oct. 5, 2012

(65) Prior Publication Data

US 2013/0031926 A1 Feb. 7, 2013

Related U.S. Application Data

(63) Continuation of application No. 13/396,316, filed on Feb. 14, 2012, now Pat. No. 8,366,930, which is a continuation of application No. 12/188,816, filed on Aug. 8, 2008, now Pat. No. 8,137,551.

(51) Int. Cl.
*B01D 35/30* (2006.01)
*B01D 27/00* (2006.01)
*B01D 35/00* (2006.01)
*B01D 29/00* (2006.01)

(52) U.S. Cl.
USPC ............ 210/232; 210/236; 210/443; 210/444

(58) Field of Classification Search
None
See application file for complete search history.

(56) References Cited

U.S. PATENT DOCUMENTS

| 5,135,645 | A | 8/1992 | Sklenak et al. |
| 5,700,371 | A * | 12/1997 | Koslow .......................... 210/232 |
| 5,914,037 | A | 6/1999 | Yen |
| 6,632,355 | B2 | 10/2003 | Fritze |
| 2003/0024860 | A1 | 2/2003 | Fritze |
| 2005/0252841 | A1* | 11/2005 | Bassett et al. .................. 210/234 |
| 2006/0000761 | A1 | 1/2006 | Choi et al. |
| 2007/0199876 | A1 | 8/2007 | Tubby et al. |
| 2008/0047889 | A1 | 2/2008 | Huda |

FOREIGN PATENT DOCUMENTS

| DE | 102006044744 | 3/2008 |
| KR | 200415015 | 4/2006 |
| KR | 200428894 | 10/2006 |
| KR | 100804302 | 2/2008 |

* cited by examiner

*Primary Examiner* — Benjamin Kurtz
(74) *Attorney, Agent, or Firm* — Robert Curcio, Esquire; DeLio, Peterson & Curcio, LLC

(57) ABSTRACT

A filter assembly for fluid filtration having a push-activated lock and release mechanism. A push filter design activates a floating key lock upon insertion and extraction, where the filter key may be used simultaneously as a lock and as an identifier for particular filter attributes. The filter base may be situated inline, and in fluid communication, with influent and effluent piping, such as within a refrigerator. The filter housing assembly may be attached to, and removed from, the filter base by a push-actuated release. Upon insertion, the filter key shifts the filter lock longitudinally to receive interlocking segments. Upon extraction, the same axial push shifts the filter lock further to align the interlocking fingers within gaps that allow for easy extraction. The specific key lock design allows a user to identify and match certain filter configurations received by the mechanical support, and reject other filter configurations.

19 Claims, 11 Drawing Sheets

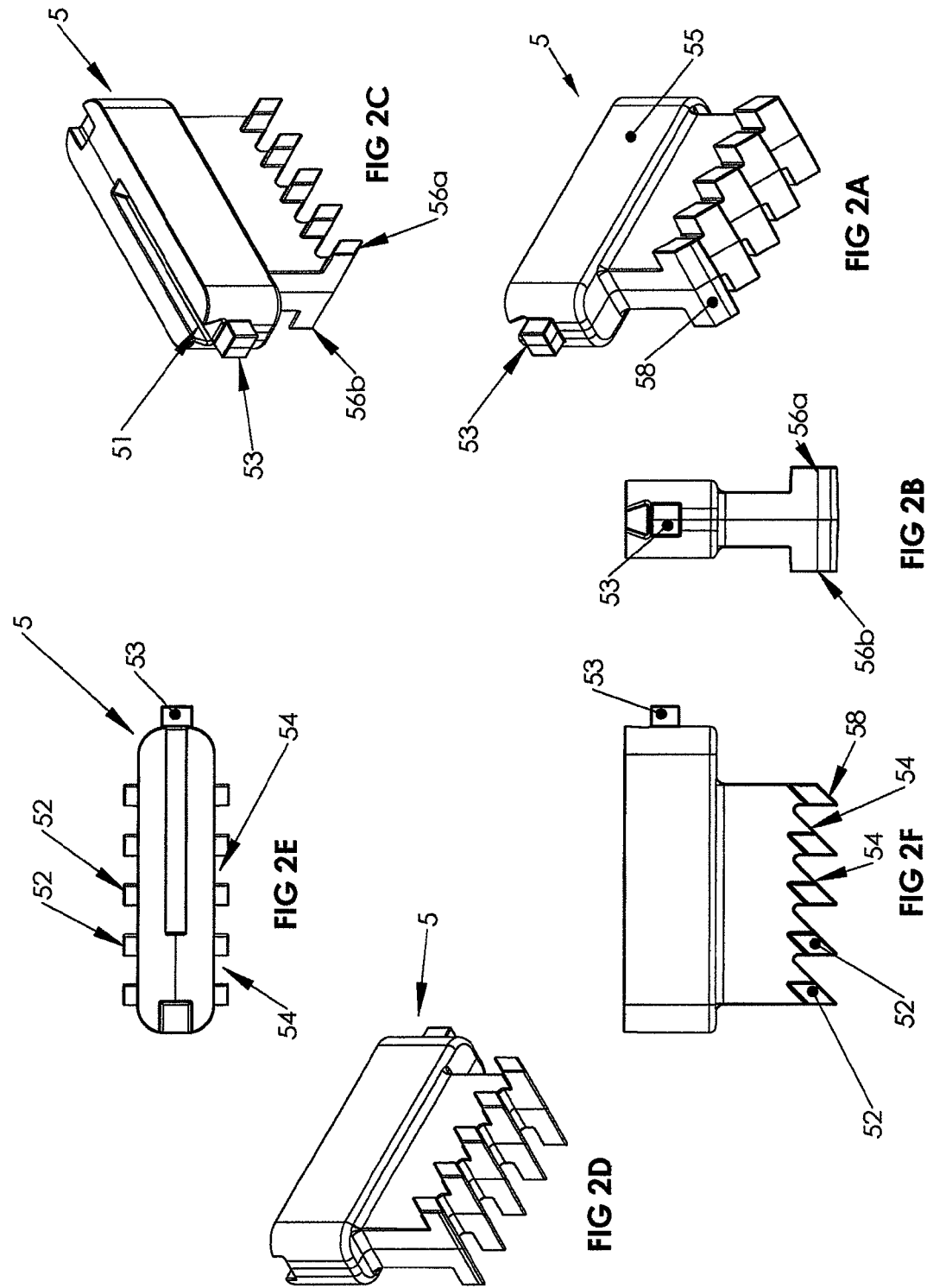

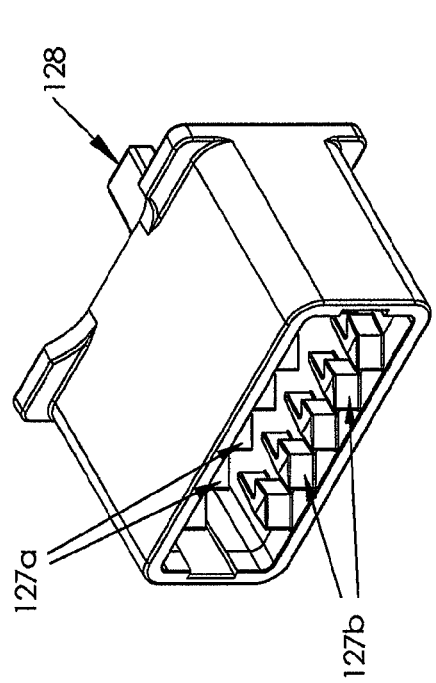
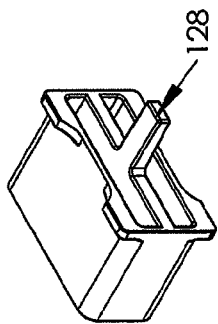
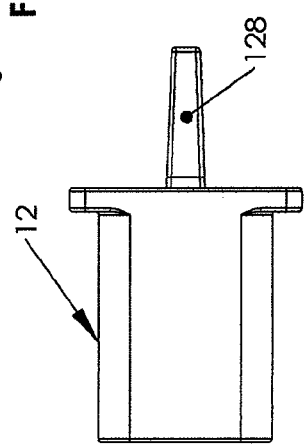
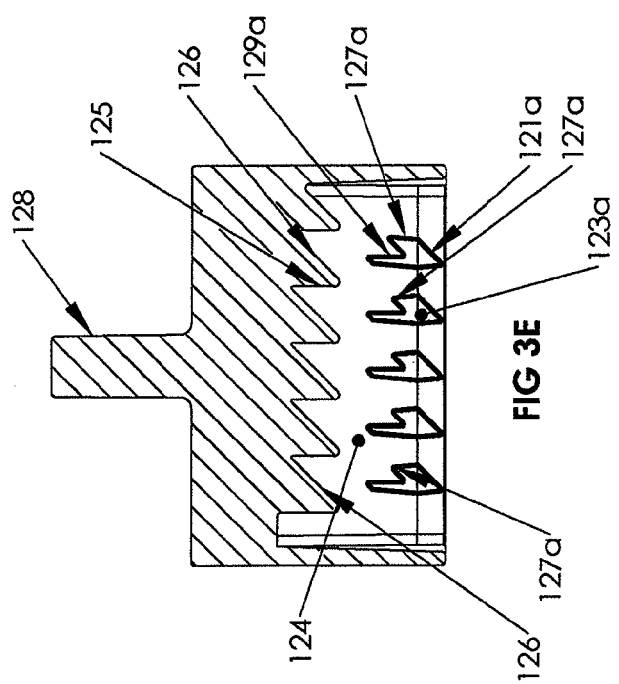
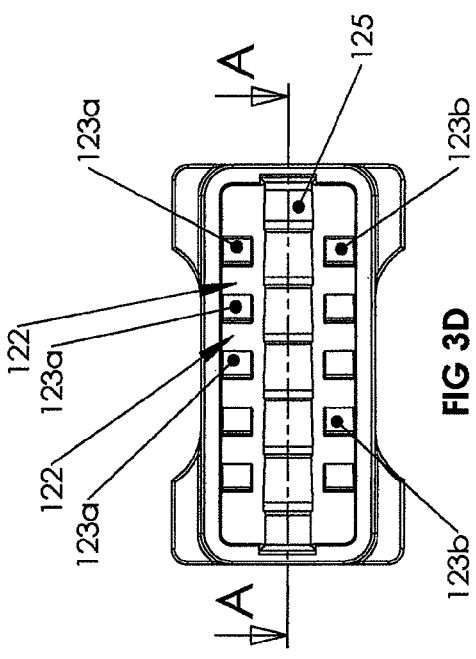

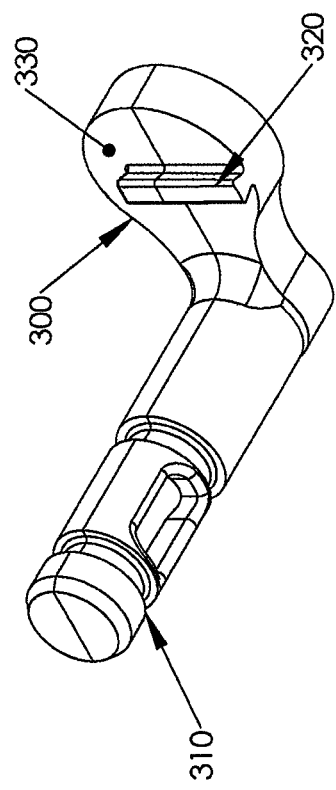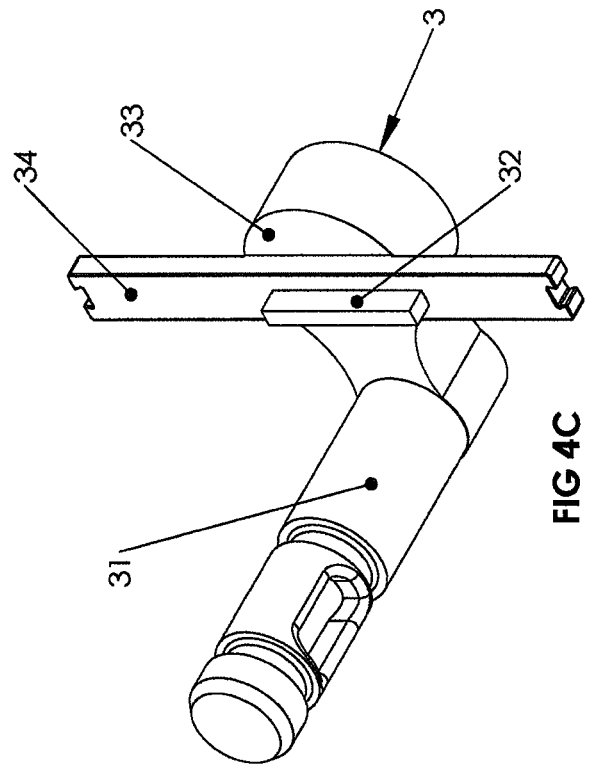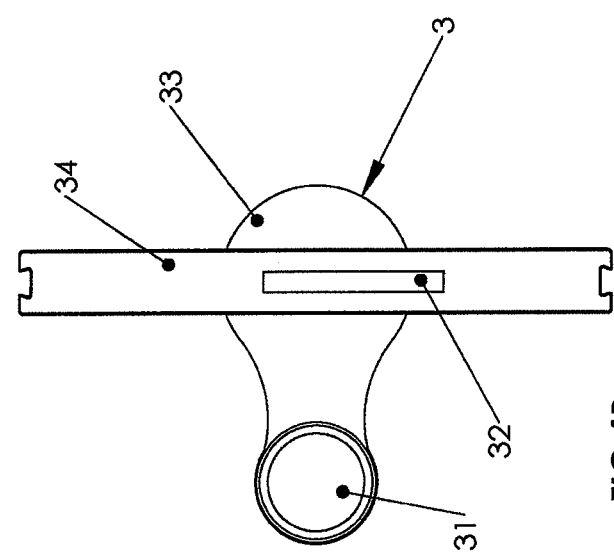

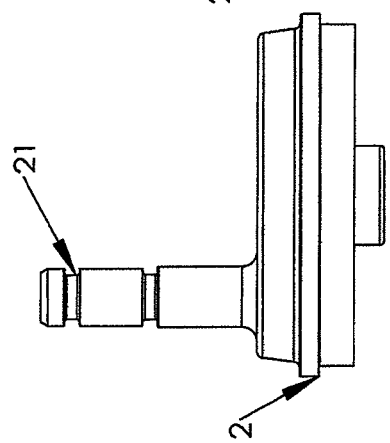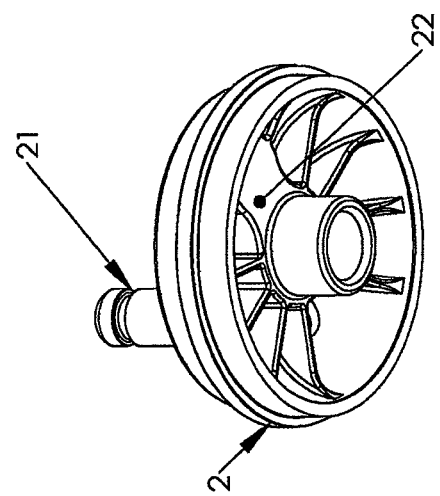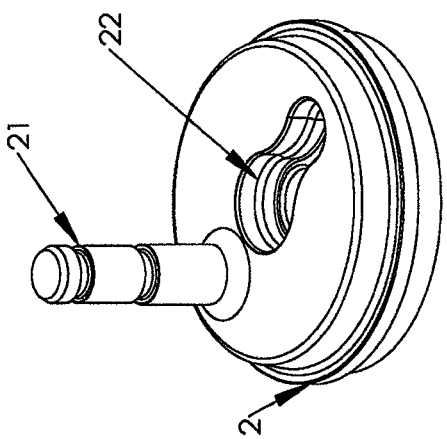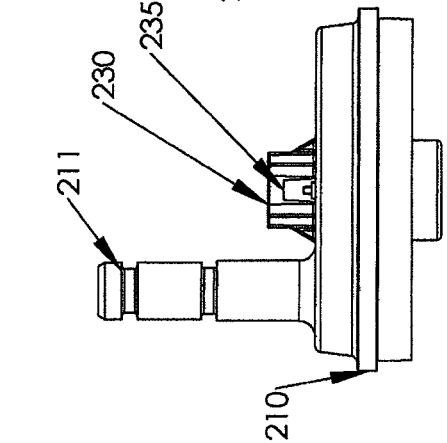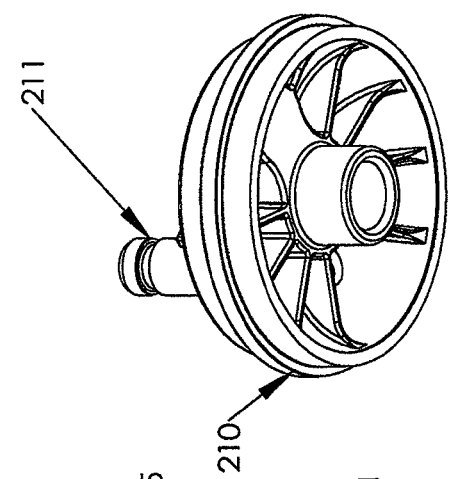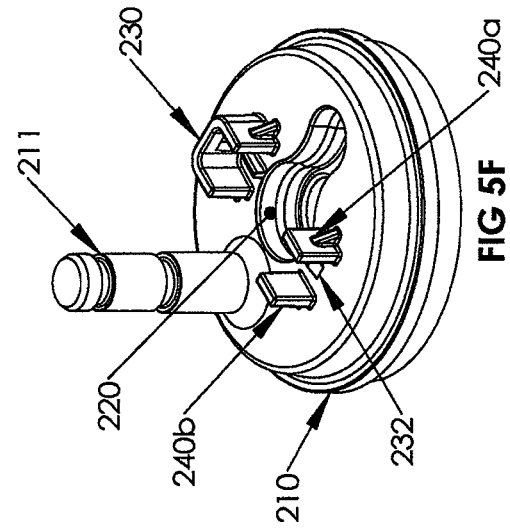

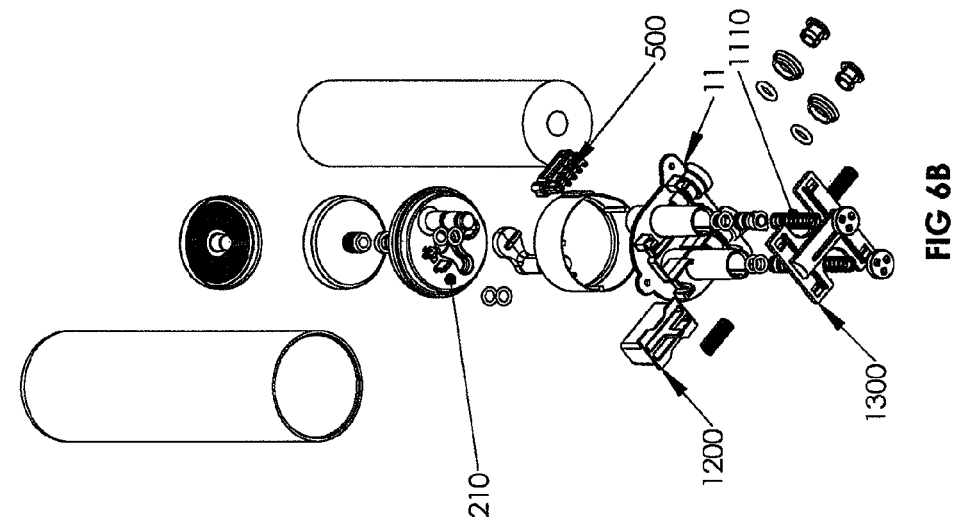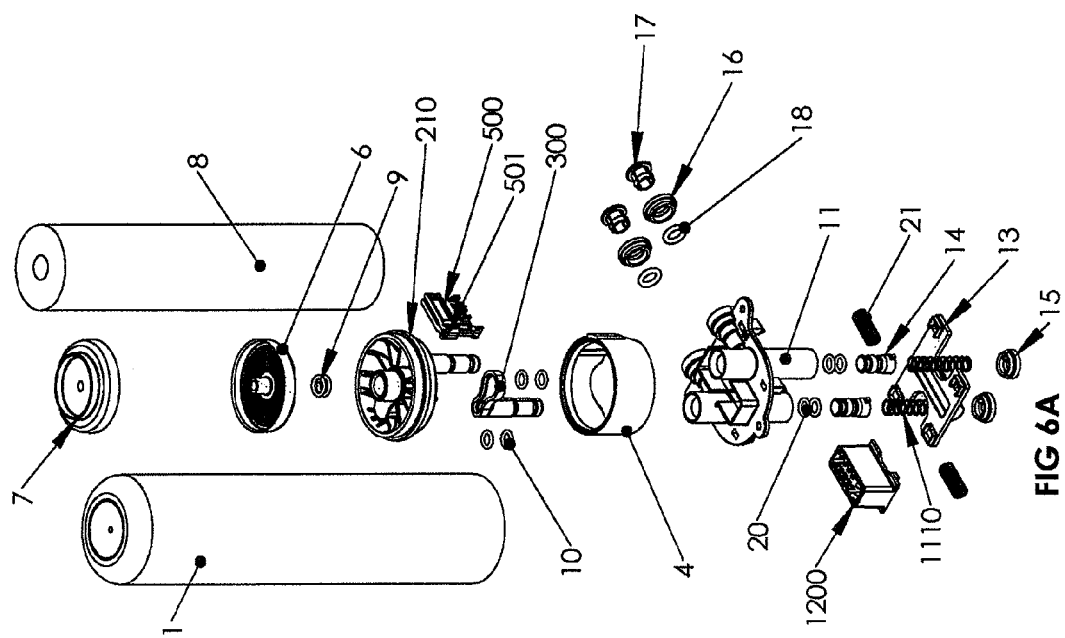

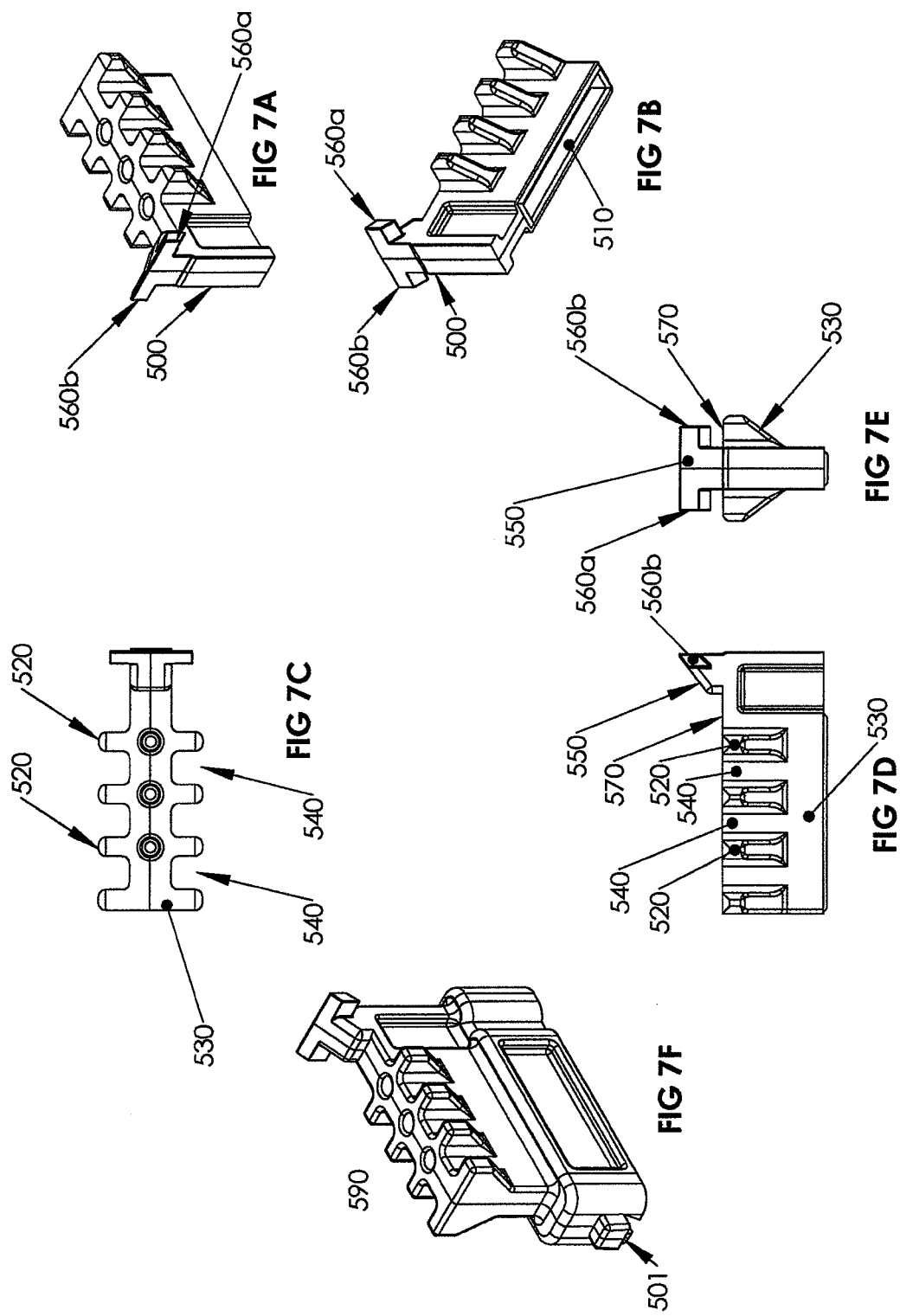

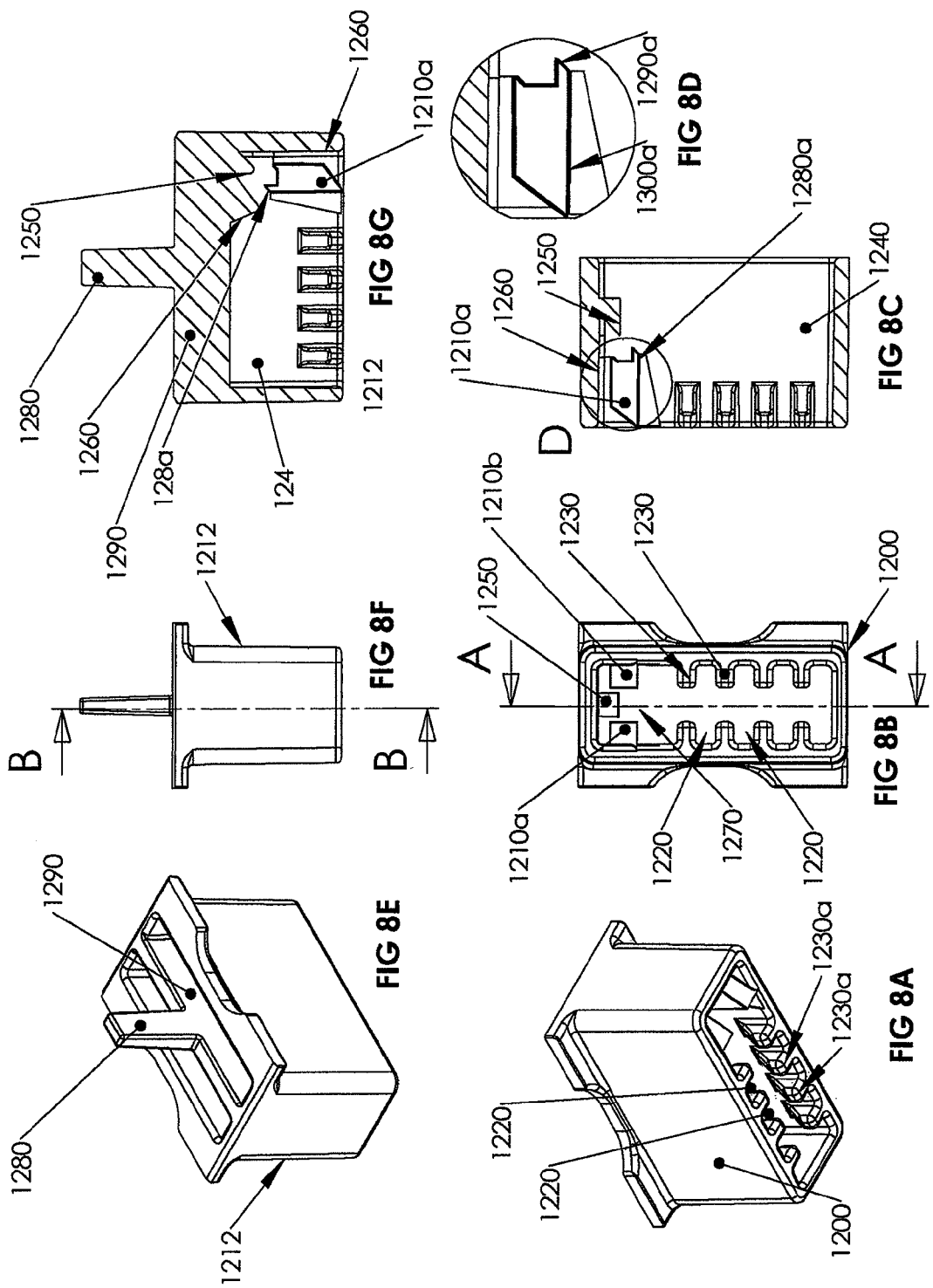

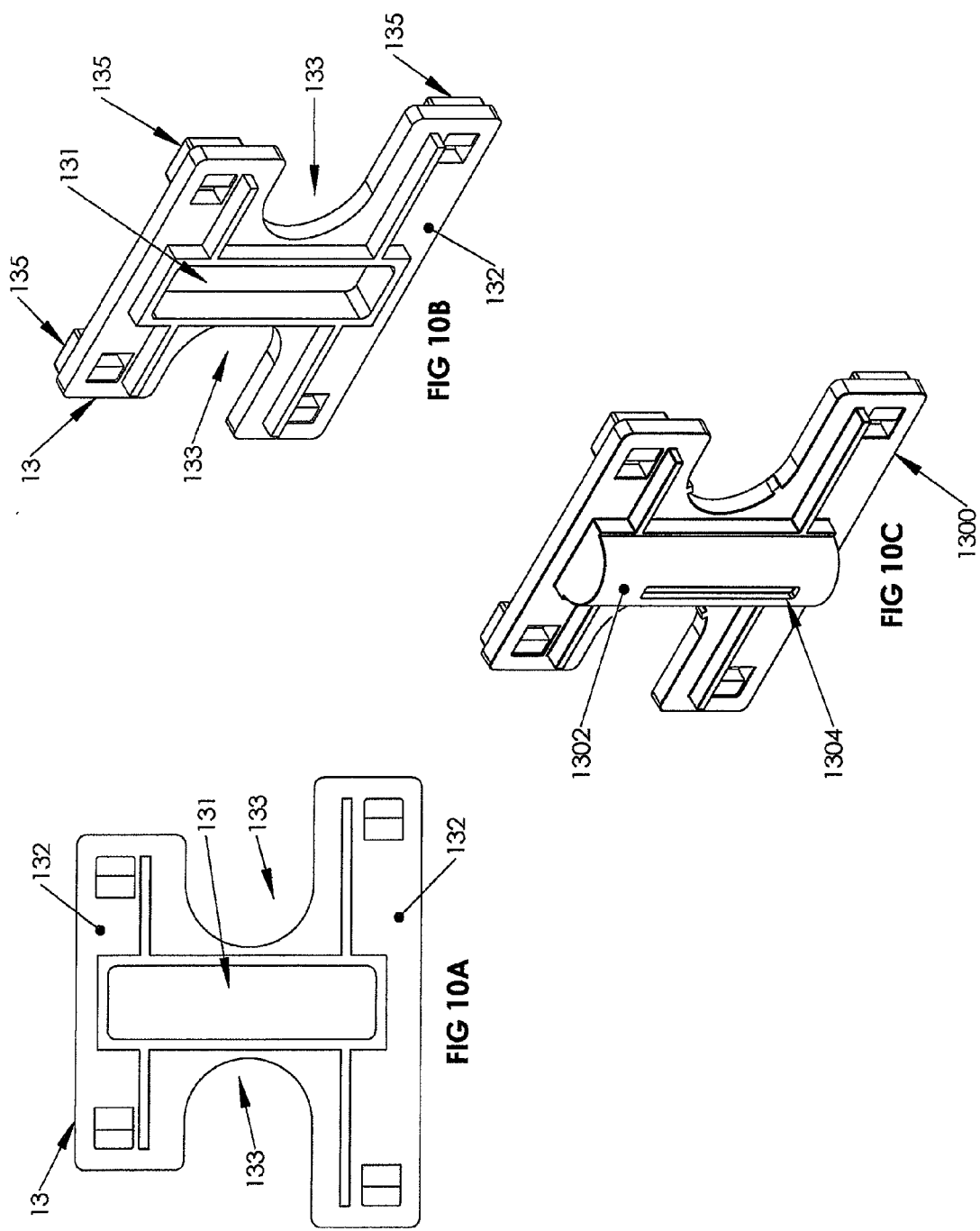

PUSH FILTER WITH FLOATING KEY LOCK

This invention relates to a filtering apparatus, specifically a filter housing apparatus to facilitate easy removal and replacement of a filter housing from a mechanical support, and more specifically, to a push filter design that activates a floating key lock, where the key may be used simultaneously as a lock and as an identifier for particular filter attributes. The mechanical support may be situated inline, and in fluid communication, with influent and effluent piping, such as within a refrigerator. More specifically, the invention relates to a filter housing and mount, whereby the filter housing may be attached to, and removed from, the mount by a push-actuated release. A controlled attachment or detachment of the filter sump, containing the filter media, is activated by the axial push of the sump towards the mechanical support. The specific key lock design allows a user to identify and match certain filter configurations received by the mechanical support, and reject other filter configurations. An internal shutoff, activated by the push-actuated release, blocks spillage during filter housing removal and replacement.

BACKGROUND OF THE INVENTION

The invention relates to a water filtration system having a locking and unlocking mechanism for changing the filter when the filter media has served its useful life. The use of liquid filtration devices is well known in the art as shown in U.S. Pat. Nos. 5,135,645, 5,914,037 and 6,632,355. Although these patents show filters for water filtration, the filters are difficult to replace owing to their design and placement. For example, U.S. Pat. No. 5,135,645 discloses a filter cartridge as a plug-in cartridge with a series of switches to prevent the flow of water when the filter cartridge is removed for replacement. The filter must be manually inserted and removed and have a switch activated to activate valve mechanisms so as to prevent the flow of water when the filter is removed. The cover of the filter is placed in the sidewall of a refrigerator and is employed to activate the switches that activate the valves. The filter access is coplanar with the refrigerator wall and forces an awkward access to the filter cartridge.

In U.S. patent application Ser. No. 11/511,599 filed on Aug. 28, 2006, for Huda, entitled "FILTER HOUSING APPARATUS WITH ROTATING FILTER REPLACEMENT MECHANISM," a filter assembly having a rotator actuating mechanism including a first internal rotator and a second internal rotator is taught as an efficient way to insert, lock, and remove the filter housing from its base. A simple push mechanism actuates the self-driving release and change over means that hold and release the filter housing sump, and provide influent shutoff to prevent leaking and spillage. Rotational shutoff and locking mechanisms are activated and released by axial force on the filter housing at the commencement of the filter changing procedure.

The instant invention is particularly useful as the water filtering system for a refrigerator having water dispensing means and, optionally, an ice dispensing means. The water used in the refrigerator or water and ice may contain contaminants from municipal water sources or from underground well or aquifers. Accordingly, it is advantageous to provide a water filtration system to remove rust, sand, silt, dirt, sediment, heavy metals, microbiological contaminants, such as Giardia cysts, chlorine, pesticides, mercury, benzene, toluene, MTBE, Cadmium bacteria, viruses, and other know contaminants. Particularly useful water filter media for microbiological contaminants include those found in U.S. Pat. Nos. 6,872,311, 6,835,311, 6,797,167, 6,630,016, 6,331,037, and 5,147,722, and are incorporated herein by reference thereto. One of the uses of the instant filter apparatus is as a water filtration apparatus for a refrigerator. Refrigerators are appliances with an outer cabinet, a refrigeration compartment disposed within the outer cabinet and having a rear wall, a pair of opposing side walls, at least one door disposed opposite the rear wall, a top and a bottom and a freezer compartment disposed in the outer cabinet and adjacent to the refrigeration compartment. It is common for refrigerators to have a water dispenser disposed in the door and in fluid communication with a source of water and a filter for filtering the water. Further, it is common for refrigerators to have an ice dispenser in the door and be in fluid communication with a source of water and a filter for filtering the water. It has been found that the filter assembly of the instant invention is useful as a filter for a refrigerator having a water dispenser and/or an ice dispenser.

SUMMARY OF THE INVENTION

The present invention is directed to, in a first aspect, a filter housing assembly comprising: a filter housing for enclosing a filter media, the filter housing having a body and a top portion for forming a fluid-tight seal with the body, the filter housing top portion including: an ingress port; an egress port; and a filter key located on the top portion and having a top surface, longitudinal sides, and lateral sides, the filter key including spaced protrusions or fingers on the longitudinal sides of the filter key extending laterally from the top surface. The fingers include winged extensions having slanted or angled faces, and may include a diamond shaped cross-section.

The filter key may include a boss extending in an axial direction above the top surface of the filter key, the boss having an angled face of predetermined width ramping upwards from the filter key top surface and lateral segments or wings extending beyond the boss width. The filter housing assembly may include a filter manifold attached to the filter housing top portion, the filter manifold comprising an attachment structure for fixably receiving the filter key. One of the ingress or egress ports may be located on the filter manifold. The spaced protrusions or fingers on the filter key may form a predetermined pattern for identifying different filter attributes unique to a filter encased within the filter housing. The filter key may also be color-coded, transparent, translucent, mirrored, textured, materially modified, or having a conductive signature for identifying different filter attributes specific to a filter encased within the filter housing. The filter key may include a locking nub or tab for attachment to the top portion. The top portion may include a filter key location boss or support member extending axially upwards from the top portion at a distance away from an axial center point, and filter key lateral support members located opposite the filter key location boss on the other side of the axial center point and extending axially upwards from the top portion, the filter key lateral support members having a separation approximately equal to the filter key width, the filter key location boss and the filter key lateral support members forming a structural support with exposed surfaces for attaching the filter key to the top portion.

In a second aspect, the present invention is directed to a filter housing assembly comprising: a filter housing for enclosing a filter media, the filter housing having a body and a top portion for forming a fluid-tight seal with the body, the filter housing top portion including: an ingress port; an egress port; a filter manifold attached to the filter housing top portion, the filter manifold comprising an attachment structure for receiving the filter key; the filter key located on the top portion and having a top surface, longitudinal sides, and lateral sides, the filter key including spaced protrusions, drive keys, or fingers on the longitudinal sides of the filter key extending laterally from the top surface, and having winged extensions with slanted or angled faces, wherein the winged extensions have a diamond shaped cross-section.

In a third aspect, the present invention is directed to a filter housing assembly comprising: a filter housing for enclosing a filter media; a filter head having at least one port in fluid communication with the filter media, the filter head forming a fluid-tight seal with the filter housing; a filter manifold comprising: a base portion axially centered about the filter head; a port in fluid communication with the filter media; and a first attachment structure located on the base portion for receiving a filter key; and the filter key having a top surface, a bottom, longitudinal sides, and lateral sides, the filter key including: spaced protrusions or fingers on the longitudinal sides of the filter key extending laterally from the top surface and having winged extensions; and a second attachment structure located on the filter key bottom for attaching the filter key to the first attachment structure on the filter manifold. The filter key fingers may include slanted or angled faces on the winged extensions. The winged extensions may have a diamond cross-section.

The filter head may include a filter key location boss or support member extending axially upwards from the filter head top surface at a distance away from the filter head axial center point, and filter key lateral support members located opposite the filter key location boss on the other side of the axial center point and extending axially upwards from the filter head top surface, the filter key lateral support members having a separation approximately equal to the filter key width, the filter key location boss and the filter key lateral support members forming a structural support with exposed surfaces for attaching the filter key to the filter head. The filter key location boss may include an aperture for receiving a locking nub or tab from the filter key. The filter key second attachment structure may comprise a complementary groove or slot on the filter key bottom to attach with the axially extending protrusion of the filter manifold. The filter manifold may also include radially extending arms about the base portion, providing structural support for a shroud. The filter key may include a boss extending in an axial direction above the top surface of the filter key, the boss having an angled face of predetermined width ramping upwards from the filter key top surface and lateral segments or wings extending beyond the boss width.

In a fourth aspect, the present invention is directed to a filter base for releasably connecting to a complementary mating filter housing assembly comprising: a base platform having fluid ingress and egress ports; and a floating lock in sliding communication with the base platform, having a bottom surface, a top surface, and longitudinal and lateral sides, the floating lock including: spaced protrusions, drive keys, or fingers on the longitudinal sides extending laterally inwards, including at least one shaped protrusion, finger, or drive key for slidably contacting the complementary mating filter housing assembly, the at least one shaped protrusion, finger, or drive key including an angled face exposed towards the bottom surface, and an edge or wedge opposite the angled face for releasably securing the complementary mating filter housing assembly.

The floating lock includes a position stop centered about the lateral sides, and located above the at least one drive key to provide a physical stop during insertion of the complementary mating filter key. The position key includes a track structure longitudinally across the floating lock. The filter base includes an enclosure for receiving the floating lock, the enclosure allowing the floating lock to slidably move therein. A rear plate may be attached to the base platform for at least partially housing the floating lock. At least one resilient member may be in contact with the floating lock to provide a retraction force when the floating lock is acted upon by the filter housing assembly during insertion or extraction of the filter housing assembly.

In a fifth aspect, the present invention is directed to a filter base for releasably receiving a complementary mating filter housing assembly comprising: a base platform having a top surface; a port for fluid ingress; a port for fluid egress; an upper ingress stanchion in fluid communication with the ingress port, the upper ingress stanchion extending upwards from the base platform top surface, the upper ingress stanchion including a first shutoff plug and a resilient member to apply axial or vertical force to the first shutoff plug to block fluid flow from the ingress port during extraction of the filter housing assembly; an upper egress stanchion in fluid communication with the egress port, the upper egress stanchion extending upwards from the base platform top surface, the upper egress stanchion including a second shutoff plug and a resilient member to apply axial or vertical force to the second shutoff plug to block fluid flow from the egress port during extraction of the filter housing assembly; a lower ingress stanchion in fluid communication with the upper ingress stanchion and the ingress port, the lower ingress stanchion extending axially downwards from the base platform for receiving an ingress port from the filter housing assembly; a lower egress stanchion in fluid communication with the upper egress stanchion and the egress port, the lower egress stanchion extending axially downwards from the base platform for receiving an egress port from the filter housing assembly; an enclosure for at least partially receiving a floating lock, the enclosure allowing the floating lock to slidably move therein; the floating lock having longitudinal sides and lateral sides, including: spaced fingers, drive keys, or protrusions located on at least one of the longitudinal sides for releasably mating with fingers of a complementary mating filter key, at least one of the fingers, drive keys, or protrusions located on an inside face of the floating lock longitudinal side, and having an angled surface for slidably contacting fingers on the complementary mating filter housing assembly, such that when the fingers of the complementary mating filter housing assembly are inserted within the floating lock, the angled surface slidably contacts the filter housing assembly finger, shifting the floating lock in a longitudinal direction, the at least one of the fingers, drive keys, or protrusions including a wedge portion on one end for releasably securing the filter housing assembly fingers; a position key centered about the floating block, above and adjacent the at least one drive key for providing a physical stop for the filter housing assembly fingers during insertion or extraction of the filter housing assembly; a rear plate attached to the base platform for housing the floating lock; and at least one resilient member attached to the floating lock to provide a retraction force when the floating lock is slidably acted upon by the filter housing assembly during insertion or extraction.

In a sixth aspect, the present invention is directed to a filter base for releasably receiving a complementary mating filter housing assembly comprising: a non-floating port including: a fluid ingress port; a fluid egress port; an ingress stanchion in fluid communication with the ingress port; an egress stanchion in fluid communication with the egress port; and a formed recess for receiving a floating lock, the recess at least partially enclosing the floating lock and having a width and length that allows the floating lock to shift longitudinally therein; the floating lock having a bottom surface, a top surface, and longitudinal and lateral sides, and seated within the non-floating port formed recess, the floating lock including: at least one drive key on the longitudinal side extending laterally inwards at the bottom surface for slidably receiving an angled boss or winged extension from a complementary mating filter housing assembly, the at least one drive key including an angled portion exposed towards the bottom surface, and an edge or wedge on each of the drive key bottom for releasably contacting with a portion of the complementary mating filter housing assembly boss or winged extension; a position key centered about lateral sides of the floating lock, and located above the at least one drive key to provide a physical stop during insertion of the complementary mating filter housing assembly; at least one resilient member in contact with the floating lock for applying a longitudinal retraction force in a direction that tends to push or pull the floating lock back to an original position; a rear plate for slidably securing the floating lock within the non-floating port; shutoff plugs in each of the stanchions for terminating fluid flow from the ingress and egress ports when the complementary mating filter housing assembly is removed from the filter base; a resilient member within each of the stanchions for applying an axial extraction force to the complementary mating filter housing assembly, and simultaneously move the shutoff plugs into position to cease fluid flow when the complementary mating filter housing assembly is extracted.

In a seventh aspect, the present invention is directed to a filter base in combination with a filter housing assembly, the combination comprising: a filter base having an ingress port and an egress port on a base platform; a slidable floating lock in slidable contact of the filter base, the floating lock having a plurality of drive keys or lateral extensions separated by gaps; a resilient member in contact with the floating lock, providing a retraction force for the floating lock; and a filter housing assembly including: a filter key having a plurality of lateral extensions separated by gaps, such that when the filter housing assembly is inserted into the filter base, the fingers of the filter key slidably contact the lateral extensions of the floating lock to shift the floating lock relative to the base platform, allowing the fingers on the filter key to traverse between the lateral extensions on the floating lock, and upon retraction of the floating lock by the resilient member, the fingers on the filter key align with the lateral extensions on the floating lock to prevent extraction of the filter housing assembly.

The floating lock includes a bottom surface, a top surface, and longitudinal and lateral sides, and wherein the lateral extensions include drive keys on the longitudinal sides extending laterally inwards at the bottom surface for slidably receiving the filter key, each of the drive keys including an angled portion exposed towards the bottom surface, and an edge or wedge on each of the drive key bottom for releasably contacting with a portion of the filter key; and a position key centered about the floating lock, and located above the drive keys to provide a physical stop during insertion of the filter housing assembly.

The combination may also include a rear plate for securing the floating lock within the filter base; shutoff plugs in each of the stanchions for terminating fluid flow from the ingress and egress ports when the filter housing assembly is extracted from the filter base; and a resilient member within each of the stanchions for applying an axial extraction force to the filter housing assembly, and simultaneously moving the shutoff plugs into position to cease fluid flow when the filter housing assembly is extracted.

In an eight aspect, the present invention is directed to a filter base in combination with a filter housing assembly, the combination comprising: a base platform having fluid ingress and egress ports; an ingress stanchion in fluid communication with the ingress port; an egress stanchion in fluid communication with the egress port; a floating lock in sliding communication with the base platform, having a bottom surface, a top surface, and longitudinal and lateral sides, the floating lock including: spaced protrusions or fingers on the longitudinal sides extending laterally inwards; at least one drive key for slidably contacting a boss of a filter key of the filter housing assembly, the at least one drive key including an angled face exposed towards the filter housing assembly, and an edge or lip adjacent the angled face for releasably securing the boss of the filter key upon insertion of the filter housing assembly; at least one resilient member in contact with the floating lock for applying a longitudinal retraction force in a direction that tends to push or pull the floating lock back to an original position; a filter housing for enclosing a filter media, the filter housing having a body and a top portion for forming a fluid-tight seal with the body, the filter housing top portion including: a filter housing ingress port; a filter housing egress port; and a filter key located on the top portion and having a top surface, longitudinal sides, and lateral sides, the filter key including: spaced protrusions or fingers on the longitudinal sides of the filter key extending laterally from the top surface; and a boss extending in an axial direction above the top surface of the filter key, the boss having an angled face of predetermined width ramping upwards from the filter key top surface and laterally extending segments or wings extending beyond the boss width; such that, when the filter housing assembly is attached to the filter base, the angled face of the boss of the filter key slidably contacts the angled face of the at least one drive key of the floating lock to shift the floating lock relative to the base platform, allowing the fingers on the filter key to traverse between the fingers on the floating lock, and upon retraction of the floating lock by the at least one resilient member, the fingers on the filter key align with the fingers on the floating lock to prevent extraction of the filter housing assembly.

In a ninth aspect, the present invention is directed to a method for attaching a filter housing assembly to a filter base comprising: inserting ingress and egress ports of the filter housing assembly into ingress and egress stanchions of the filter base; inserting a filter key of the filter housing assembly having lateral fingers with winged extensions into a slidable floating lock having lateral fingers or drive keys by using the filter key to shift the slidable floating lock longitudinally, whereby the lateral fingers of the filter key transverse the lateral fingers or drive keys of the floating lock; and releasing the filter housing assembly so that resilient members in the filter base apply an extraction force to the filter housing, moving the filter housing assembly slightly in an axial extraction direction; and providing a retraction force to the floating lock during the releasing to align the floating lock fingers or drive keys with the filter key fingers, such that extraction of the filter housing assembly is prohibited.

In a tenth aspect, the present invention is directed to a method for extracting a filter housing assembly from a filter base comprising: applying an axial insertion force to the filter housing assembly already connected to the filter base towards the filter base thereby inserting a filter key on the filter housing assembly further into a slidable floating lock of the filter base; releasing the slidable floating lock, such that the floating lock moves relative to the filter key under a resilient retraction force; aligning fingers on the filter key between fingers or drive keys on the floating lock; and applying an axial extraction force to the filter housing assembly to remove the filter housing assembly from the filter base.

In an eleventh aspect, the present invention is directed to a refrigerator in combination with a filter assembly comprising: an outer cabinet; a refrigeration compartment disposed within the outer cabinet and having a rear wall, a pair of opposing side walls, at least one door disposed opposite the rear wall, a top and a bottom; a freezer compartment disposed in the outer cabinet and adjacent to the refrigeration compartment; a water dispenser disposed in the door and in fluid communication with the filter assembly with automated assembly for changing a sump and filter media from the refrigerator; the filter assembly comprising: a filter housing for enclosing a filter media, the filter housing having a body and a top portion for forming a fluid-tight seal with the body, the filter housing top portion including: an ingress port; an egress port; and a filter key located attached to the filter housing and having a top surface, longitudinal sides, and lateral sides, the filter key including spaced protrusions or fingers on the longitudinal sides of the filter key extending laterally from the top surface.

It is an object of this invention to provide a filter housing apparatus mounted to a base and having an automatic locking mechanism for simple replacement and removal.

It is an object of this invention to provide a filter housing apparatus and base attached by a push activated, slideably moveable, floating lock.

It is another object of this invention to provide a filter housing apparatus mounted on a surface having non-rotating locking means with pressure activation for replacement and removal.

It is another object of the present invention to provide a filter housing apparatus that allows for a keyed identification of the filter.

It is a further object of this invention to provide a filter housing apparatus for use with water dispensing and\or ice dispensing apparatus whereby filtered water is provided to the water dispensing and/or ice dispensing apparatus.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings in which:

FIG. 2A is a perspective view of one embodiment of the filter key of the present invention.

FIG. 2B is a lateral side view of the filter key of FIG. 2A.

FIG. 2C depicts a bottom plan view of the filter key of FIG. 2A showing a groove and a locking nub or tab for attachments.

FIG. 2D depicts a perspective view from the opposite side of the filter key of FIG. 2C.

FIG. 2E depicts a bottom view of the filter key of FIG. 2A.

FIG. 2F is a longitudinal side view of the filter key of FIG. 2A.

FIG. 3A depicts a perspective view of one embodiment of the floating lock or sliding lock of the present invention.

FIG. 3B is a perspective view from the opposite side of the floating lock of FIG. 3A.

FIG. 3C is a lateral side view of the floating lock of FIG. 3A.

FIG. 3D depicts a top view of the floating lock of FIG. 3A.

FIG. 3E depicts cross-sectional longitudinal side view of the floating lock of FIG. 3A.

FIG. 4A is a perspective view of one embodiment of the filter manifold.

FIG. 4B is a top plan view of a second embodiment of the filter manifold with an extension support member.

FIG. 4C is a perspective view of a second embodiment of the filter manifold.

FIG. 5A is a side view of one embodiment of the filter head of the present invention.

FIG. 5B is a bottom perspective view of the filter head of FIG. 5A.

FIG. 5C is a top perspective view of the filter head of FIG. 5A.

FIG. 5D is another embodiment of the filter head with a snap fit lock for the filter key.

FIG. 5E is a bottom perspective view of the filter head of FIG. 5D.

FIG. 5F is a top perspective view of the filter head depicting the aperture for receiving the filter key.

FIGS. 6A and 6B are exploded views of a second embodiment of the filter assembly of the present invention, showing a filter key having an extended boss.

FIG. 7A is a top perspective view of an embodiment of the filter key of the present invention having an extended boss.

FIG. 7B is a bottom perspective view of the filter key of FIG. 7A.

FIG. 7C depicts a top plan view of the filter key of FIG. 7A.

FIG. 7D depicts a side plan view of the filter key of FIG. 7A.

FIG. 7E depicts an end or lateral side view of the embodiment of the filter key of FIG. 7A, showing the boss rising above the plane created by the fingers, and two wings extending laterally outwards from the boss.

FIG. 7F is a perspective view of a another embodiment of the filter key of the present invention showing a locking nub located on the bottom portion on a lateral side.

FIG. 8A depicts a perspective view of an embodiment of the floating lock of the present invention.

FIG. 8B is a top view of the floating lock of FIG. 8A.

FIG. 8C is a cross-sectional view of the floating lock of FIG. 8A depicting a drive key located at one end of the floating lock on the longitudinal or side panel.

FIG. 8D depicts an exploded view of the drive key of FIG. 8C showing the edge angle and face.

FIG. 8E depicts a perspective view of a floating lock having an extension member.

FIG. 8F is a side view of the floating lock of FIG. 8E having an extension member.

FIG. 8G is a lateral or cross-sectional view of the floating lock of FIG. 8E with an extension member.

FIG. 10A is a top plan view of one embodiment of the rear plate of the present invention.

FIG. 10B is a bottom perspective view of the rear plate of FIG. 10A.

FIG. 10C is a top plan view of a second embodiment of the rear plate of the present invention.

DETAILED DESCRIPTION OF THE PREFERRED EMBODIMENT(S)

In describing the preferred embodiment of the present invention, reference will be made herein to FIGS. 1 to 11 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of the mechanical locking assembly of the filter housing without the need for excess force and tight tolerances essential in prior art filter housings makes for easy and frequent filter changes and optimal filter performance. The filter housing assembly of the present invention provides simplified filter changes to minimize process downtime and without recourse to tools. A simple push mechanism actuates the self-driving release and change over means that hold and release the filter housing sump or filter cartridge, and provides influent shutoff means to prevent leaking and spillage. A floating lock or sliding lock responsive to an axial insertion force from the filter cartridge moves perpendicular or radially to the axial motion of the sump, and allows a specific filter key to insert within the floating lock. Once inserted, the floating lock retracts towards its original position under a resilient force, such as two springs in tandem, or other complementary resilient mechanism keeping the floating lock under retraction tension when moved from its initial position. The filter key and floating lock combination allows for the identification of specific filter models and may be configured to reject all but specific filter types.

Removal of the filter cartridge is performed in the same manner. An axial insertion force causes the floating lock to move radially, which allows the filter key to be removed from the floating lock. An extraction force provided by spring tension, or the like, helps push the filter cartridge out of its base. Fluid shutoff and locking mechanisms are initiated by the axial force on the filter cartridge at the commencement of the filter changing procedure.

The present invention is described below in reference to its application in connection with, and operation of, a water treatment system. However, it should be apparent to those having ordinary skill in the art that the invention may be applicable to any device having a need for filtering liquid.

Figures 1A, 1B:
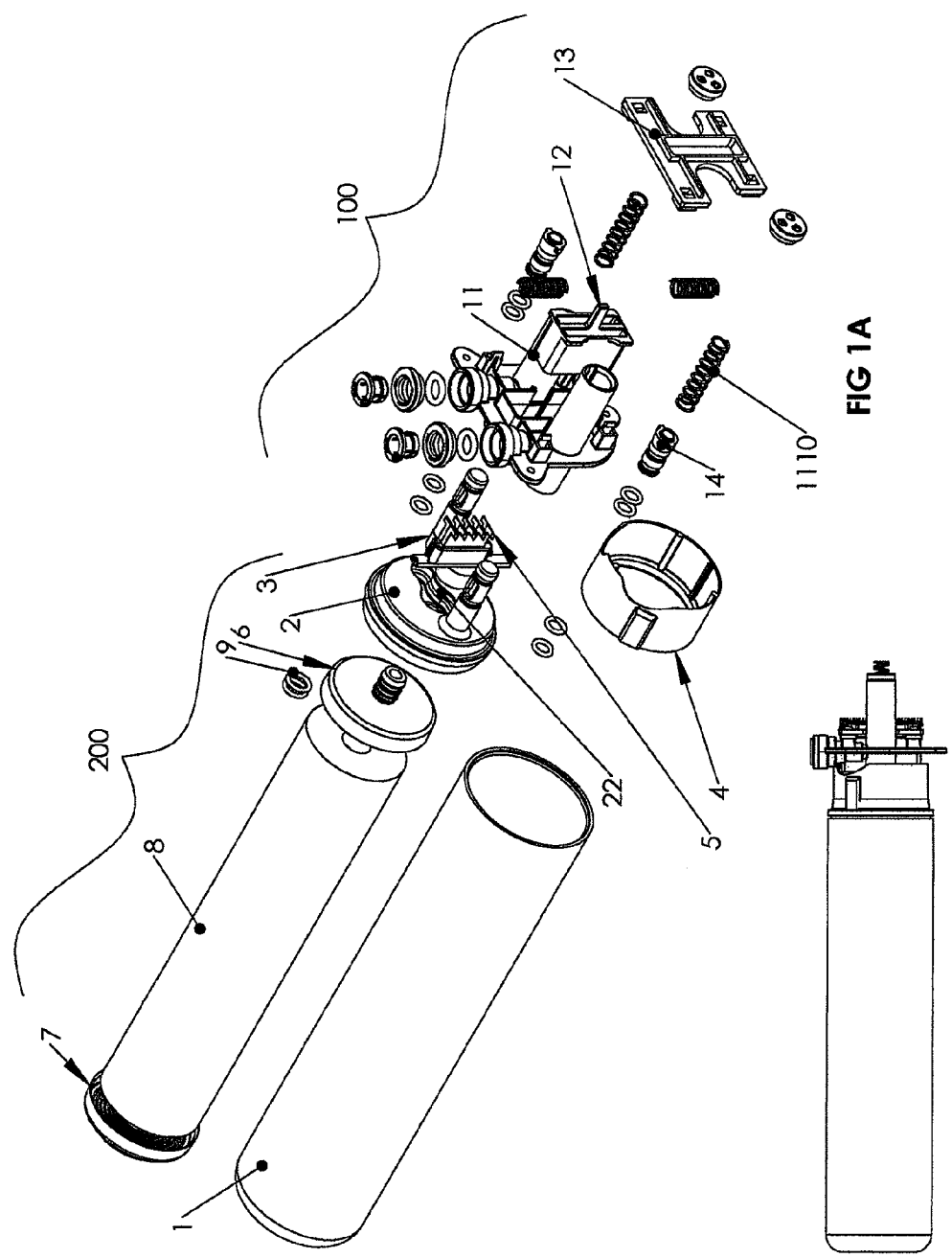
FIG. 1A is a top exploded view of one embodiment of the filter assembly of the present invention.
FIG. 1B is a side plan view the embodiment of the filter housing assembly of FIG. 1A.

FIG. 1A is a top exploded view of the preferred embodiment of the filter assembly of the present invention. The filter assembly is fixably secured in a position within an operating environment requiring fluid filtration, such as attached to an internal sidewall of a refrigerator, although certainly other operating environments may be envisioned, and the filter assembly may be used in any number of environments where the filter assembly has access to, and can be placed in fluid communication with, influent and effluent fluid access ports. For illustrative purposes only, application to the filtering of water being piped into a refrigerator is discussed.

A filter housing assembly 200 comprises the removable, detachable filter cartridge or sump of the filter assembly from a filter base 100. Filter housing assembly 200 includes a filter housing 1, which encloses filter media 8, a filter head 2 that attaches at one end to filter housing 1, and attaches at the other end to a filter manifold 3 and non-floating port 11. A filter key 5 is attached to filter manifold 3. Filter base 100 includes non-floating port 11, floating lock 12, and rear plate 13. Filter head 2 secures in a water-tight fit to filter housing 1. The attachment scheme may be made by a water-tight screw fit, bond, weld, or other water-tight fastening mechanism commonly used in the art for sealing adjoining components, typically adjoining plastic components. As discussed in further detail below, filter key 5 is connected to filter manifold 3. Filter key 5 may be formed as one piece with filter manifold 3, or may be securely attached by other methods, such as bonding, welding, press fit, friction fit, or the like. Filter key 5 may also be removably attached for replacement by an end user. Filter manifold 3 is attached to filter head 2. Filter manifold 2 may be removably attached as well for replacement by an end user. Filter media 8 is located in filter housing 1. Each end of filter media 8 is secured by a cap that facilitates the direction of the fluid being treated by the filter. At one end, filter media 8 is secured by a closed end cap 7, and at the other end by open end cap 6. Filter media 8 may be any filter media known in the art, and preferably, is a carbon block filter. It is typically shaped in a similar fashion as filter housing 1, which in the preferred embodiment is cylindrical. Open end cap 6 is designed to interface and be in fluid communication with filter head 2. Filter housing assembly 200 is a finished assembly including filter housing 1, which encompasses filter media 8 by closed end cap 7 at one end, and open end cap 6 at the other. Generally, o-ring seals, such as o-ring seal 9, are used to prevent water leakage where different components are expected to mate. Filter manifold 3 and filter key 5 are joined with filter head 2, and secured to filter housing 1 to form the assembled filter housing apparatus 200. These components may be integral, permanently secured, or removably attached to one another, and to filter head 2. FIG. 1B is a side plan view of the preferred embodiment of the filter assembly of the present invention.

FIG. 2A is a perspective view of filter key 5. FIG. 2B is a lateral side view of filter key 5. As previously noted, the bottom of filter key 5 is attached to filter manifold 3 by any number of fastening schemes, or may be integrally formed with filter manifold 3. FIG. 2C depicts a groove 51 that is preferably shaped to receive a complementary protrusion on filter manifold 3, and is preferably shaped to receive a dovetail protrusion; however, other connecting, complementary shapes are not excluded. The connection of filter key 5 with filter manifold 3 may be bonded, sonic welded, press fitted, friction fitted, or the like. As depicted in the illustrative embodiment, groove 51 is shaped to accept a snap feature for a press or snap fit located on filter manifold 3. In this manner filter key 5 may be removably attached to filter manifold 3. Similarly, filter manifold 3 may be designed to be removably attached to filter head 2. Thus, the design has more flexibility to introduce and accommodate different key configurations, which can be used to designate specific filter types, and purposely reject other filter types.

FIG. 4A depicts a perspective view of the one embodiment of filter manifold 300. Port 310 is shown off center of filter manifold 300. FIG. 4A depicts the filter manifold without extension support members. Preferably, port 310 is an outlet port; however, the present invention is not limited to a specific ingress and egress location, and may have these ports interchanged. When port 310 is used as an egress or outlet port, filter manifold 300 takes fluid from filter media 8 through the center port of open cap 6, and directs fluid flow radially outwards from the axial center to port 310. In this embodiment, the ingress port is located on filter head 2. By locating the ingress and egress ports off axis, filter housing assembly 200 has a more robust design, with enhanced structural integrity for mounting to the filter base, and for remaining fixably in place during attachment. Referring to FIGS. 4A-4C, in a preferred attachment scheme for filter key 5, a protrusion 32 or 320 is formed on or near the center line of filter manifold 3 or 300. Protrusion 32 or 320 is preferably a rectangular shaped segment extending above circular center portion 33 or 330. Protrusion 32 allows for precise alignment of filter key 5, while providing a robust connection. A dovetail shape, press fit, or friction fit interconnection between protrusion 32 and groove 51 of filter key 5 permits the user to remove and replace filter key 5. This allows for the designation of specific filter keys, and correspondingly, specific filter cartridges. Protrusion 32 or 320 may be integrally formed with filter manifold 3 or 300, respectively, or may be separately fabricated and attached by bond, weld, press fit, friction fit, or other suitable means known in the art. Preferably, protrusion 32 or 320 has a dovetail shaped surface for mating with complementary groove 51 of filter key 5.

In the embodiment depicted by FIGS. 4B and 4C, protrusion 32 may be on an extension support 34. FIG. 4B depicts a top level view of filter manifold 3, showing extension support 34 extending longitudinally or radially outward from center portion 33, along a radius. Extension support 34 supports optional shroud 4 that covers and protects filter head 2.

Filter manifold 3 or 300 seats within, and attaches to, filter head 2. FIG. 5A depicts a side view of one embodiment of filter head 2. Filter head 2 is shown with off-center port 21. In this manner, port 21 of filter head 2 and port 31 of filter manifold 3 are both off-center and parallel to one another about a plane that approximately intersects the center point of filter head 2. As shown in FIGS. 1, 4, and 5, a recessed portion 22 formed about the center point of filter head 2 receives center portion 33 of filter manifold 3. If extension support 34 is used with filter manifold 3, when filter manifold 3 is inserted within filter head 2, extension support 34 is situated approximately perpendicular to the plane formed by ports 21 and 31. Extension support 34 provides at each end a snap fit design for shroud 4. FIG. 5B is a bottom perspective view of the filter head. FIG. 5C is a top perspective view of filter head 2 depicting recess portion 22.

Filter head 210 depicts another embodiment as shown in FIGS. 5D-5F. In this embodiment, as depicted in the top perspective view of FIG. 5F, on the top surface of filter head 210 is a curved receiving boss or support member 230 located on one side of the center point, and two parallel, lateral support members 240a,b located opposite curved boss 230 on the other side of the center point of filter head 210. These structural support members are used to align filter key 5 to filter head 210, and help secure filter key 5. This filter head may be used in conjunction with the filter manifold 300 without extension supports, as depicted in FIG. 4A. Structural support member 230 provides a physical stop for filter key 5, which typically slides on protrusion 32 provided by filter manifold 300. Lateral support members 240a,b are used to align filter key 5, and prevent it from inadvertent shifting. FIG. 5E is a bottom perspective view of filter head 210. FIG. 5D is a side view of filter head 210.

Filter manifold 300 includes an off-center port 310, as well as a center portion 330 that fits securely within recess 220 of filter head 210. Protrusion 320 receives the groove from filter key 5. In this embodiment, when filter key 5 is slidably inserted within protrusion 320, structural support member 230 and lateral structural support members 240a,b secure filter key 5. The curved portion of structural support member 230 forces filter key 5 to be inserted in one direction only. An added boss 232, located on the top of filter head 210 and centered between lateral support members 240a,b may be employed to serve as a lock or snap fit for filter key 5. Additionally, in another embodiment, structural support member 230 may be formed with a small aperture 235 located directly away from the center point of filter head 210 at its base where support member 230 meets the top portion of filter head 210.

This small aperture 235 is designed to receive a protruding material or locking nub or tabe 53 placed at, or formed with, the corresponding end portion of filter key 5 on the lower end of a lateral side. Locking nub or tab 53 on filter key 5 is inserted within small aperture 235 on the curved portion of structural support member 230 and prevents axial removal of filter key 5 away from filter head 210. FIGS. 2A-2F show locking nub 53 located on the bottom portion of a lateral side of filter key 5. FIG. 5D is a side view of filter head 210 depicting aperture 235 for receiving filter key 5.

Filter key 5 includes at least one laterally extending finger 52, and preferably a plurality of extending fingers, as depicted in FIGS. 2A-2F. FIG. 2C is a bottom perspective view of filter key 5. In a first illustrative embodiment, filter key 5 is shown with ten laterally extending fingers 52. Fingers 52 are preferably constructed of the same material as, and integrally formed with, base 55 of filter key 5. However, the fingers may also be removably attached, and the filter key design is not limited to an integrally formed construction. The laterally extending fingers 52 may form a number of different configurations. In the illustrative embodiment, there is a uniform gap 54 between each finger 52. In other configurations, a finger may be missing on one or both sides of filter key 5, and gap 54 may be wider in some places than in others. Using a digital 1, 0 designation to indicate a finger (1) or a gap (0), it is possible to have many different configuration for a filter key. The configuration as shown in FIG. 2E would be designated on each side as 101010101. As a separate example, for a designation of 100010101, this would represent a lateral finger (1) followed by a wide gap (000), and then a finger (1) followed by a gap (0) and a finger (1) followed by another gap (0), and one last finger (1). The present invention is not limited to any particular finger/gap order. Additionally, it is not necessary for the finger/gap configuration on one side of filter key 5 to be symmetric with the finger/gap configuration on the opposite side. By having different finger/gap configurations, it is possible to make a mechanical key identifier for the specific filter housing assembly being employed. Filter key 5 may also be color-coded to facilitate identification for different filter cartridges or housing assemblies. It may also be textured, mirrored, transparent, translucent, materially modified, or having a conductively signature, or any combination thereof, for identification purposes. More importantly, aside from identification of the filter housing assembly, a particular filter key finger/gap configuration will only allow for the use of a specific filter housing assembly in a given system.

Fingers 52 of filter key 5 are strength bearing members, used to mate with, or interlock with, corresponding drive keys 123a,b located on longitudinal sides of floating lock 12 as depicted in FIG. 3. There must be at least one drive key on floating lock 12 that corresponds to, and lines up with, at least one finger on filter key 5, so that when filter key 5 is inserted to mate with floating lock 12, the drive keys slidably contact the fingers and floating lock 12 is shifted longitudinally an incremental amount to allow fingers 52 on filter key 5 to traverse between the gaps 122 on floating lock 12. Once fingers 52 have passed between the corresponding gaps on floating lock 12, which is slidably restrained under tensional forces, floating lock 12 is partially returned towards its original position by the tensional retraction forces so that at least one finger on filter key 5 aligns or interlocks with at least one drive key on floating lock 12, and the alignment resists any direct outward, axial extraction forces.

Each finger 52 of filter key 5 includes a slanted face 58 as depicted in FIGS. 2A and 2F. These angled features are made to slidably contact complementary slanted edge or angled features 121a,b of drive keys 123a,b of floating lock 12 shown in FIGS. 3A and 3E. During insertion of filter key 5, the sliding contact of the angled feature of the filter key's fingers transversely shifts floating lock 12 off of its initial position, and allows the fingers of filter key 5 to be inserted within gaps 122 between the drive keys 123a,b.

A perspective view of floating lock 12 is depicted in FIGS. 3A and 3B. Floating lock 12 has angled-faced fingers, protrusions, or drive keys 123a,b and gaps 122 that may reciprocally correspond to fingers 52 and gaps 54 located on filter key 5. It is not necessary for the drive key/gap configuration of floating lock 12 to be exactly complementary to the finger/gap configuration of filter key 5. It is only necessary that floating lock 12 is able to fully receive the inserting filter key 5 when filter housing assembly 200 is axially inserted into filter base 100. Each drive key 123a,b of floating lock 12 is shaped with a receiving wedge 129a,b, respectively, opposite slanted edge 121a,b to capture fingers 52 of filter key 5. Fingers 52 may have a cross-sectional diamond shape to facilitate the capture by the drive key receiving wedge 129a,b. Drive keys 123a,b are placed on at least one longitudinal side of floating lock 12, as depicted in FIGS. 3D and 3E. Underneath and centered between drive keys 123a,b is a row of position stops 125. Position stops 125 preclude fingers 52 from extending any further during insertion. There need not be a position stop 125 for each drive key 123a,b, provided there is at least one position stop 125 to prohibit over insertion of filter key 5. Position stops 125 also include a slanted or angled face 126 for slidable contact with slanted face 58 of fingers 52 on filter key 5. Position stops 125 are shown as a row of jagged edges, but do not have to correspond one-for-one with drive keys 123a,b.

Upon insertion, when fingers 52 of filter key 5 contact drive keys 123a,b, floating lock 12 shifts away from its initial position, against retraction forces, and moves according to the contacting angled edges 58 and 121. Once wings 56a,b of fingers 52 clear lip 127a,b of drive keys 123a,b, floating lock 12 is not prohibited from reacting to the retraction forces, and moves slightly back, towards its original position where diamond shaped wings 56a,b are then trapped by receiving wedges 129a,b. This position locks filter key 5 to floating lock 12 resisting any a direct axial extraction force.

There is a gap or space 124 between the bottom most portion of drive key 123a,b and top most portion of position stop 125. Upon extraction, when wings 56a,b of fingers 52 are pushed within this gap or space, there is no structure preventing floating lock 12 from responding to the tensional retraction forces acting on it. Thus, floating lock 12 is free to respond to the retraction forces, and will tend to move towards its initial position. This will align fingers 52 of filter key 5 within gaps 122 of floating lock 12 and allow for easy extraction of filter housing 200.

In order to extract filter housing assembly 200, a user again pushes axially inwards on the filter housing assembly, which releases wings 56a,b on filter key 5 from drive keys 123a,b. This frees floating lock 12 to return to towards its original position, and locates fingers 52 on filter key 5 at gaps 122 of floating lock 12. Filter housing assembly 200 can now be freely extracted from filter base 100. Resilient members 1110 within shut-off stanchions 1101a,b of non-floating port 11 assist in pushing or extracting filter housing assembly 200 away from filter base 100.

Figure 9B:
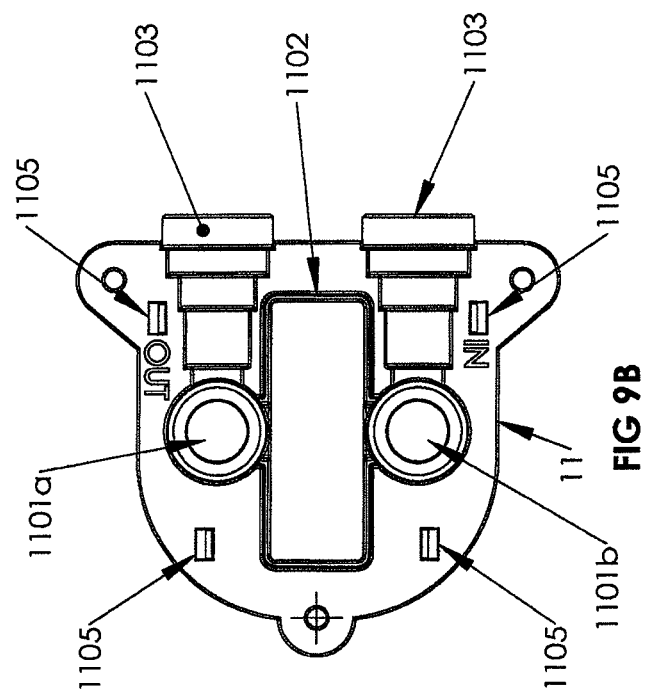
FIG. 9B is a top plan view of the non-floating port of FIG. 9A.
Figure 9A:
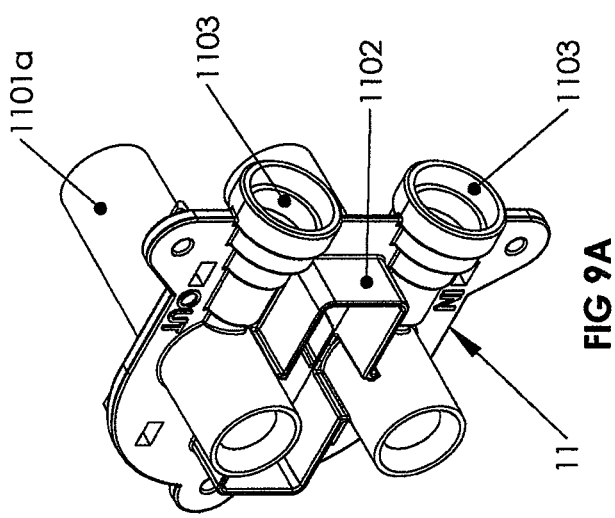
FIG. 9A is a perspective view of a non-floating port of the present invention.
Figure 11:
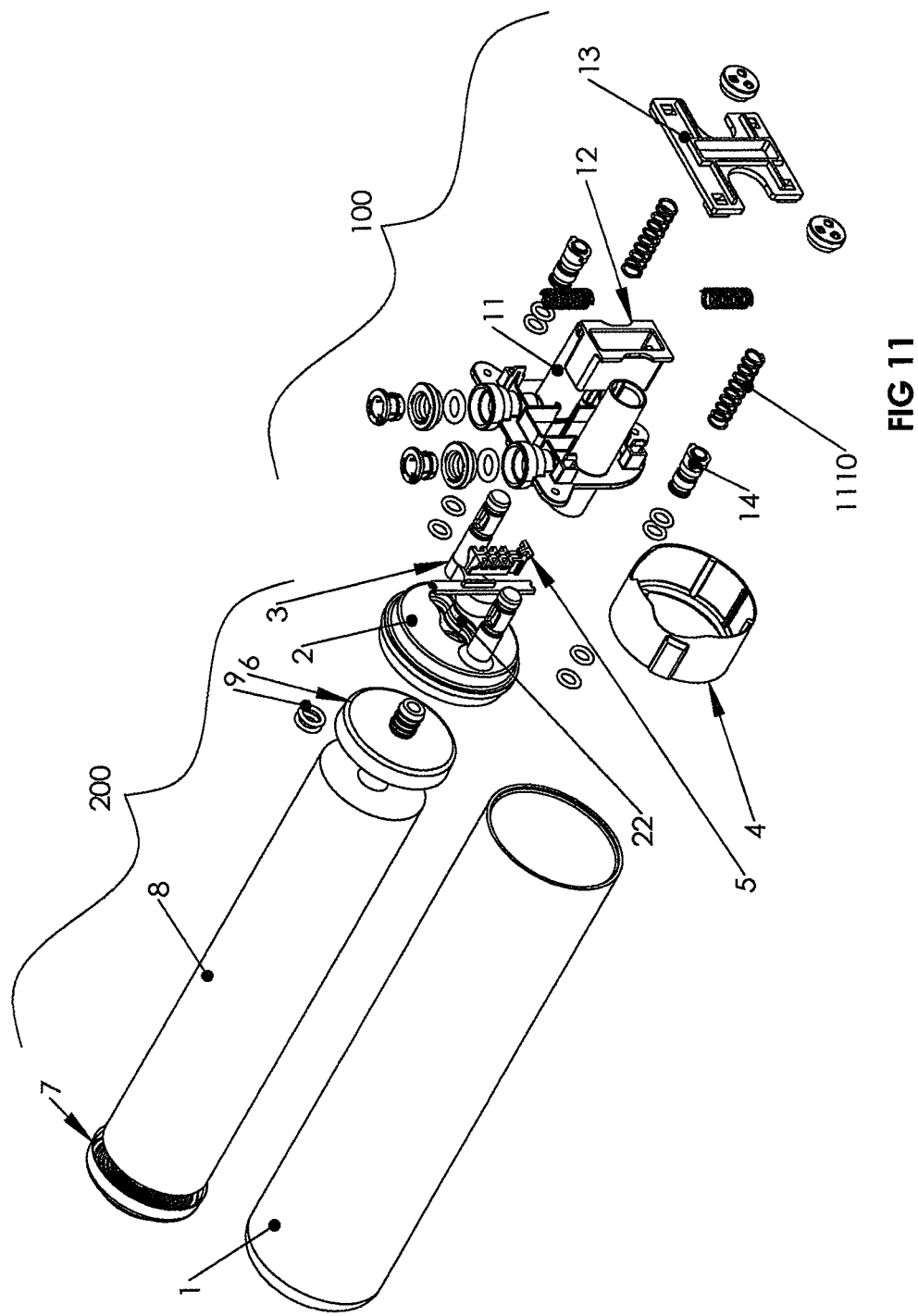
FIG. 11 is an exploded view of a filter assembly of the present invention, showing a filter key having a boss, connected to a filter manifold having extension supports.

FIG. 9A is a perspective view of non-floating port 11, which works in tandem with rear plate 13 or rear plate 1300 to hold floating or sliding lock 12 in place while allowing it to freely move longitudinally off its center position and back to its center position during the insertion and extraction of filter housing assembly 200. As discussed further herein, non-floating port 11 will also hold floating lock 1200 and floating lock 1212 of FIG. 8. For simplicity, reference is made chiefly to the interaction of non-floating port 11 with floating lock 12, although the applicability of non-floating port 11 includes usage with floating lock 1200 and 1212 as well. Non-floating port 11 includes a protruding encasement 1102, larger than floating lock 12, and made to enclose floating lock 12 therein. Encasement 1102 prevents over-travel of floating lock 12, and protects it when installed from extraneous, unintended movement. FIG. 9B is a top plan view of non-floating port 11. Stanchions 1101a,b are located on opposite sides of encasement 1102. Ports 1103 represent the ingress and egress ports for the fluid. Shut-off stanchions 1101a,b include shutoff plugs 14, which act as valve seals to stop fluid flow when the filter cartridge is being removed. Shut-off stanchions 1101a,b are preferably cylindrical in shape, containing spring activated, o-ring sealed plugs for sealing the ingress and egress lines during filter cartridge removal. In a preferred embodiment, rear plate 13 is snap fitted into non-floating port 11. In order to accommodate this, snap fittings 1105 are shown on non-floating port 11 that receive a corresponding fitting 135 on rear plate 13.

Referring to FIG. 1, floating lock 12 is supported by non-floating port 11 and rear plate 13. FIG. 10A is a top plan view of one embodiment of rear plate 13 of the present invention. FIG. 10B depicts a bottom perspective view of rear plate 13. Rear plate 13 secures floating lock 12 within a support structure in non-floating port 11. Rear plate 13 is preferably attached by snap fit to non-floating port 11, although other attachment schemes known in the art may be easily employed, such as bonding, welding, and assorted mechanical fasteners. Rear plate 13 is formed with extensions 132 on each end, and shaped gaps 133 therebetween. Gaps 133 are shaped to go around shut-off stanchions 1101a,b of non-floating port 11. In this embodiment, rear plate 13 includes a center aperture 131 that allows for longitudinal movement of floating lock 12. Floating lock 12 may include an extension member opposite the face configured with fingers and gaps, in order to permit resilient components, such as helical or torsion springs to act upon it. FIGS. 3C and 3E are side views of the floating lock showing extension member 128. FIG. 3B is a perspective view of the floating lock 12 with extension member 128. FIG. 8E depicts floating lock 1212 with extension member 1280. In these embodiments, the extension member is acted upon by resilient devices held by the rear plate.

FIG. 10C is a top plan view of another embodiment of the rear plate 1300 of the present invention. In this embodiment, the topside of rear plate 1300 includes a domed, slotted cover 1302 over the center aperture. Cover 1302 is formed to encase springs or other resilient members about the extension member 128 extending from floating lock 12. Dome 1302 includes a slot 1304 that is made to receive the extension member 128 from floating lock 12. Slot 1304 helps retain linear movement of floating lock 12 inside dome 1302. In this embodiment, two complementary resilient members, such as springs, would reside on each side of the extension member 128 of floating lock 12. One resilient member preferably applies force on the floating lock extension member in one direction, while the other resilient member applies force to the floating lock extension member in the opposite direction. In this manner, no matter which way floating lock 12 is moved or shifted, a retraction force presents itself to return floating lock 12 to its original, centered position.

At all times during insertion, the filter housing assembly is under extraction forces that tend to push the housing out of the filter base. These extraction forces result from resilient members in each shut-off stanchion 1101*a,b* of non-floating port 11 (shown in FIG. 9B) that force shutoff plugs 14 into position in order to block the ingress and egress ports. Preferably, the extraction forces on shutoff plugs 14 are provided by a spring 1110 in each port, although other resilient members may be used to provide a similar result. Inserting the filter housing assembly into the filter base works against these extraction forces, and pushes shutoff plugs 14 further up each shut-off stanchion 1101*a,b* of non-floating port 11. This allows for fluid ingress, while keeping the filter housing assembly under the constant extraction force.

Protective port shroud 4 may be placed over filter head 2, to protect the floating lock 12 and filter key 5 mechanism from damage and debris. Shroud 4 is preferably supported by the extension supports on the filter manifold.

FIGS. 6A and 6B are exploded views of another embodiment of the filter assembly of the present invention, showing the combination of filter manifold 300, filter key 500, and filter head 210. Filter key 500 is depicted without a locking nub or tab; however it may included a locking nub to facilitate attachment to the filter head. FIG. 7F depicts filter key 590 with locking nub or tab 501. Locking nub 501 is located at the base of filter key 590. In this embodiment, filter key 500 or 590 and filter manifold 300 are modified such that floating lock 1200 or 1212 of FIG. 8 is slidably shifted by the interaction wings 560*a,b* of an extended boss 550 on filter key 500 or 590 with drive keys 1210*a,b* of floating lock 1200.

Filter key 500 or 590 is inserted within floating lock 1200 through the axial insertion of the filter housing assembly into the filter base. Hammerhead shaped wings 560*a,b* on fingers 520 of filter key 500 and drive keys 1210*a,b* on floating lock 1200 or 1212 slidably contact one another, causing a transverse motion of floating lock 1200 or 1212 perpendicular to the axial motion of insertion. In this manner, floating lock 1200 or 1212 is shifted longitudinally, in a direction radially relative to the filter housing assembly axis. Fingers 520 of filter key 500 are positioned within the gaps 1220 on floating lock 1200 or 1212. Once filter key 500 or 590 is inserted, floating lock 1200 or 1212 is returned partially towards its original position by retracting tensional forces, preferably by complementary spring forces, so that the fingers on floating lock 1200 or 1212 align directly with fingers 520 on filter key 500 or 590, thus preventing a direct extraction force from removing the filter housing assembly from the filter base.

FIG. 7F depicts a top perspective view of filter key 590. At one end of filter key 590 is an upwardly extended angled boss 550. Boss 550 rises above horizontal plane 570 created by the top portion of fingers 520, and is angled toward fingers 520, with its highest point at one end of filter key 500. Boss 550 angles downward from its highest point towards fingers 520. Preferably, boss 550 is an upwardly facing triangular or wedge shaped design having wings 560*a,b* for interaction with drive keys 1210*a,b*, respectively, on floating lock 1200. FIG. 7E depicts an end view of filter key 500 showing a hammerhead shaped boss 550 rising above plane 570 created by fingers 520, and wings 560*a,b* extending laterally from boss 550 resembling what may be considered a hammerhead shape. The purpose of wings 560*a,b* is to contact corresponding angled drive keys 1210*a,b* on floating key 1200.

A perspective view of the complementary floating lock 1200 is depicted in FIG. 8A. The only difference between floating lock 1200 of FIG. 8A and floating lock 1212 of FIG. 8E is the addition of an extension member 1280 on floating lock 1212. Floating lock 1200 has fingers 1230*a,b* and gaps 1220 that may reciprocally correspond to fingers 520 and gaps 540 located on filter key 500 or 590. It is not necessary for the finger/gap configuration of floating lock 1200 to be exactly complementary to the finger/gap configuration of filter key 500 or 590. It is only necessary that floating lock 1200 is able to fully receive the inserting filter key 500 when the filter housing assembly is axially inserted into the filter base. Furthermore, once floating lock 1200 is subjected to retraction forces acting to return it partially towards its original position, it is necessary that at least one finger on filter key 500 or 590 vertically align with at least one finger on floating lock 1200 or 1212 preventing any extraction without further shifting of floating lock 1200 or 1212.

Using floating lock 1200 and filter key 500 as illustrative examples, upon slidable contact of wings 560*a,b* on filter key 500 and drive keys 1210*a,b* on floating lock 1200, floating lock 1200 moves in a transverse motion, perpendicular to the axial motion of insertion. In this manner, floating lock 1200 is shifted longitudinally, in a direction radially relative to the filter housing assembly axis. Fingers 520 of filter key 500 are positioned within the gaps 1220 on floating lock 1200. Once filter key 500 is inserted, floating lock 1200 is returned partially towards its original position by retracting tensional forces, preferably by complementary spring forces, so that the fingers on floating lock 1200 align directly with fingers 520 on filter key 500, thus preventing a direct extraction force from removing the filter housing assembly from the filter base.

Fingers 1230*a,b* are preferably constructed of the same material as floating lock 1200 and integrally formed therewith. However, fingers 1230 may also be removably attached, and the floating lock design is not limited to an integrally formed construction. Additionally, the present invention is not limited to any particular finger/gap order. It is not necessary for the finger/gap configuration on one side of floating lock 1200 to be symmetric with the finger/gap configuration on the opposite side. Floating lock 1200 is responsive to tensional forces, such as complementary springs acting on it from two separate directions to provide resistance longitudinally. Floating lock 1200 effectively moves longitudinally when acted upon by filter key 500, and is forced to return partially towards its original position after fingers 520 of filter key 500 have traversed through gaps 1220. Upon partial retraction, fingers 520 are aligned behind or underneath fingers 1230 of floating lock 1200. FIG. 8B is a top view of floating lock 1200 showing laterally extending fingers 1230*a,b* and adjacent gaps 1220 between the fingers.

FIG. 8C is a cross-sectional view of floating lock 1200, depicting drive key 1210*a*, which is located at one end of floating lock 1200 on longitudinal or side panel 1240. Drive key 1210*a* is opposite a similar drive key 1210*b* (not shown), which is located on the opposite longitudinal panel of floating lock 1200. Both drive keys are designed to have an angled face for slidably interacting with wings 560*a,b* of boss 550 on filter key 500. Each drive key is preferably integrally fabricated with floating lock 1200; however, the drive keys may be fabricated separately and attached to the longitudinal panels of floating lock 1200 by attachment means known in the art. As shown in FIG. 8C, below drive key 1210*a* is a position key or physical stop 1250, preferably formed with the supporting lateral wall 1260 of floating lock 1200. As shown in FIG. 8B, position key 1250 is situated between drive keys 1210*a,b*. Position key 1250 may be integrally formed with lateral wall 1260, or may be separately attached thereto by any acceptable means in the prior art, such as bonding, welding, gluing, press fitting, and the like. Position key 1250 acts as a physical stop to ensure against over travel of floating lock 1200. Position key 1250 is situated below drive keys 1210*a,b* by a distance designed to accommodate the insertion of boss 550 of filter key 500. Upon insertion of filter key 500 into floating lock

1200, boss 550 traverses through gap 1270 in floating lock 1200 formed by the space between drive keys 1210*a,b*. Wings 560*a,b* of boss 550 extend outward relative to the width of boss 550, traversing between lateral wall 1260 and drive keys 1210*a,b*. In this manner, wings 560*a,b* retain floating lock 1200 from retracting back to its original position while boss 550 is being inserted. At all times, floating lock 1200 is under the retraction force of resilient members, such as tandem springs, or the like, tending to keep floating lock 1200 its original position, which is preferably a centered position. During insertion of filter key 500, wings 560*a,b* interact with drive keys 1210*a,b* to shift floating lock 1200 longitudinally off-center while under the resilient retraction forces. Upon full insertion, when boss 550 reaches and contacts position key 1250, wings 560*a,b* are no longer held by drive keys 1210*a,b* because the length of drive keys 1210*a,b* is shorter than the length of boss 550. At this point in the insertion process, the tensional retraction forces shift floating lock 1200 towards its original position.

Once wings 560*a,b* reach position key 1250, and the user releases the insertion force initially applied on the filter housing assembly, the extraction forces from shutoff plug springs 1110 dominate. These forces push the filter housing assembly axially outwards, away from floating lock 1200. Since wings 560*a,b* are no longer bound between drive keys 1210*a,b* and lateral wall 1260, floating lock 1200 will tend to shift longitudinally, partially towards its original position as filter key 500 moves slightly axially outwards. At this point, wings 560*a,b* interact with edge angles 1280*a,b* to push away from the center position, shifting filter key 500, and combining or contacting with face 1300*a,b* to keep the filter housing from retracting. FIG. 8D depicts an exploded view of drive key 1210*a* with edge angle 1290*a* and face 1300*a*.

Fingers 520 of filter key 500 are now aligned with fingers 1230 of floating lock 1200 and remain in contact in a vertical plane in the axial direction, prohibiting extraction of the filter housing assembly from the filter base.

It is envisioned that the preferred embodiment of the present invention would be disposed in a refrigerator, most likely within the door. The output of the filter assembly may be selectively coupled to a water dispenser or an ice dispenser. The water source to the refrigerator would be in fluid communication with filter base 100, and prohibited from flowing when filter housing assembly 200 is removed from filter base 100. Shutoff plugs 14 in stanchions 1101*a,b* seal fluid flow until filter housing assembly 200 is inserted in filter base 100. Upon insertion, fluid would flow to the filter housing assembly and filter water would be returned from the filter housing assembly.

All parts of the filter housing assembly 200 and filter base 100 may be made using molded plastic parts according to processes known in the art. The filter media may be made from known filter materials such as carbon, activated carbons, malodorous carbon, porous ceramics and the like. The filter media, which may be employed in the filter housing of the instant invention, includes a wide variety of filter media capable of removing one or more harmful contaminants from water entering the filter housing apparatus. Representative of the filter media employable in the filter housing include those found in U.S. Pat. Nos. 6,872,311, 6,835,311, 6,797,167, 6,630,016, 6,331,037, and 5,147,722. In addition, the filter composition disclosed in the following Published Applications may be employed as the filter media: US 2005/0051487 and US 2005/00111827.

The filter assembly is preferably mounted on a surface in proximity to a source of water. The mounting means are also preferably in close proximity to the use of the filtered water produced by the filter housing apparatus.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A filter housing assembly comprising:
 a filter housing for enclosing a filter media, said filter housing having a body and a top portion for forming a fluid-tight seal with said body, said filter housing top portion including:
 an ingress port;
 an egress port;
 a filter key located on said top portion and having a top surface, longitudinal sides, and lateral sides, each of said filter key longitudinal sides including a plurality of spaced protrusions or fingers extending laterally from said top surface, wherein said fingers include winged extensions having slanted or angled faces for mating attachment to a filter base or manifold.

2. The filter housing assembly of claim 1 wherein said fingers include a diamond shaped cross-section.

3. The filter housing assembly of claim 1 including having said filter key attached to said filter housing top portion by snap fit, friction fit, welding, or bonding.

4. The filter housing assembly of claim 1 including a filter manifold or base attached to said filter housing top portion, said filter manifold or base comprising an attachment structure for fixably receiving said spaced protrusions or fingers on said longitudinal sides of said filter key.

5. The filter housing assembly of claim 4 wherein one of said ingress or egress ports is located on said filter manifold.

6. The filter housing assembly of claim 1 wherein said ingress port and said egress port are off axial center of said filter housing.

7. The filter housing assembly of claim 1 wherein said spaced protrusions or fingers are integrally formed with said filter key.

8. The filter housing assembly of claim 1 including having said spaced protrusions or fingers forming a predetermined pattern for identifying different filter attributes unique to a filter encased within said filter housing.

9. The filter housing assembly of claim 1 including having said filter key color-coded, transparent, translucent, mirrored, textured, materially modified, or having a conductively signature for identifying different filter attributes specific to a filter encased within said filter housing.

10. A filter housing assembly comprising:
 a filter housing for enclosing a filter media, said filter housing having a body and a top portion for forming a fluid-tight seal with said body, said filter housing top portion including:
 an ingress port;
 an egress port;
 a filter manifold attached to said filter housing top portion, said filter manifold comprising an attachment structure for receiving a filter key, said filter key located on said top portion and having a top surface, longitudinal sides, and lateral sides, each of said filter key longitudinal sides including a plurality of spaced protrusions, drive keys, or fingers extending laterally from said top surface, and having winged extensions with slanted or angled faces, wherein said winged extensions have a diamond shaped cross-section.

11. A filter housing assembly comprising:
a filter housing for enclosing a filter media;
a filter head having at least one port in fluid communication with said filter media, said filter head forming a fluid-tight seal with said filter housing;
a filter manifold comprising:
　a base portion axially centered about said filter head;
　a port in fluid communication with said filter media; and
　a first attachment structure located on said base portion for receiving a filter key;
　wherein said filter manifold is formed integrally with said filter head, and
　said filter key having a top surface, a bottom, longitudinal sides, and lateral sides, said filter key including:
　　two opposing longitudinal sides having a plurality of spaced protrusions or fingers on each longitudinal side extending laterally from said top surface and having winged extensions; and
　　a second attachment structure located on said filter key bottom for attaching said filter key to said first attachment structure on said filter manifold.

12. The filter housing assembly of claim 11 wherein said filter key is fixably or removably attached to said filter manifold.

13. The filter housing assembly of claim 11 wherein said filter key fingers include slanted or angled faces on said winged extensions.

14. The filter housing assembly of claim 13 wherein said winged extensions have a diamond shaped cross-section.

15. A method for extracting a filter housing assembly from a filter base comprising:
　applying an axial insertion force to said filter housing assembly already connected to said filter base towards said filter base thereby inserting a filter key on said filter housing assembly further into a slidable floating lock of said filter base, said filter key having longitudinal sides with a plurality of fingers or spaced protrusions on each of said longitudinal sides;
　releasing said slidable floating lock, such that said floating lock moves relative to said filter key under a resilient retraction force;
　aligning said plurality of fingers on each longitudinal side of said filter key between fingers or drive keys on said floating lock; and
　applying an axial extraction force to said filter housing assembly to remove said filter housing assembly from said filter base.

16. A refrigerator in combination with a filter assembly comprising:
an outer cabinet;
a refrigeration compartment disposed within said outer cabinet and having a rear wall, a pair of opposing side walls, at least one door disposed opposite said rear wall, a top and a bottom;
a freezer compartment disposed in said outer cabinet and adjacent to said refrigeration compartment;
a water dispenser disposed in said door and in fluid communication with said filter assembly with automated assembly for changing a sump and filter media from said refrigerator;
said filter assembly comprising:
a filter housing for enclosing a filter media, said filter housing having a body and a top portion for forming a fluid-tight seal with said body, said filter housing top portion including:
an ingress port;
an egress port; and
a filter key located attached to said filter housing and having a top surface, longitudinal sides, and lateral sides, each of said filter key longitudinal sides including a plurality of spaced protrusions or fingers extending laterally from said top surface.

17. The combination according to claim 16 including having said filter key formed integrally with said filter housing top portion.

18. The filter housing assembly of claim 16 including having said filter key removably attached to said top portion.

19. The filter housing assembly of claim 16 including a filter manifold attached to said filter housing top portion, said filter manifold comprising an attachment structure for fixably receiving said filter key.

\* \* \* \* \*